Oct. 30, 1962    H. A. MEYER    3,060,918
PORTABLE BARBECUE
Filed March 13, 1959    2 Sheets-Sheet 2
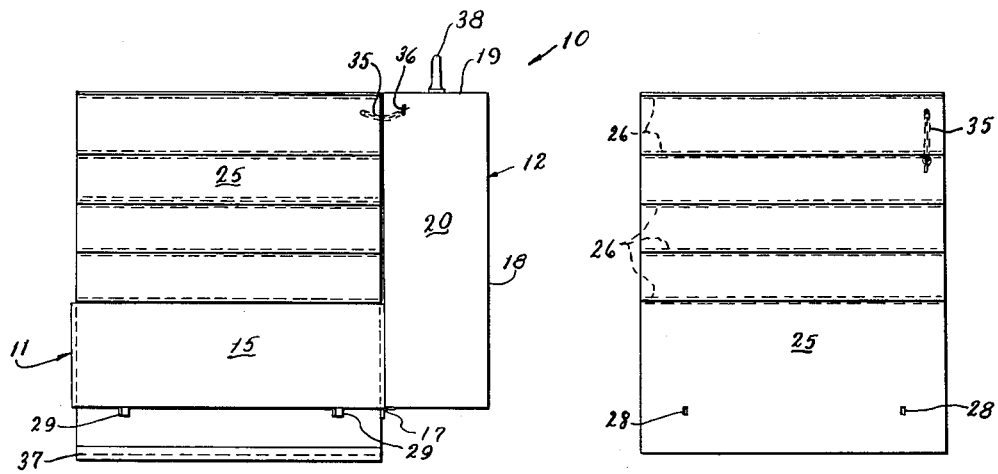
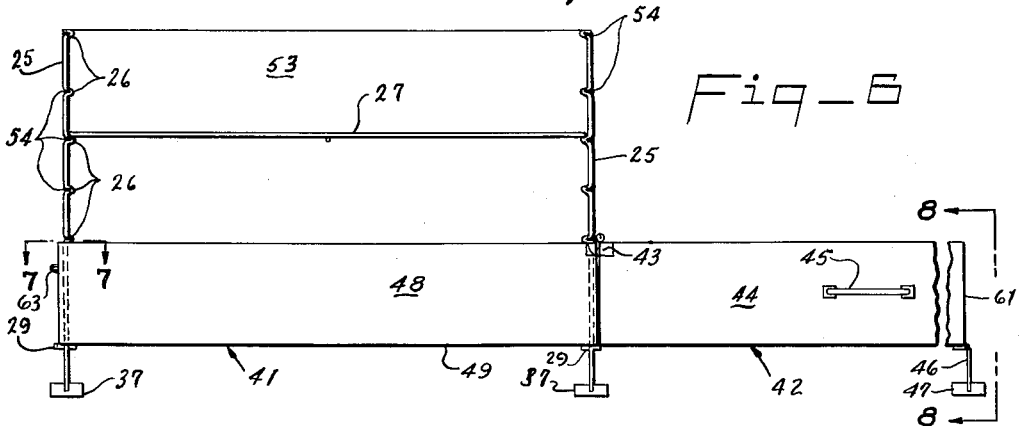
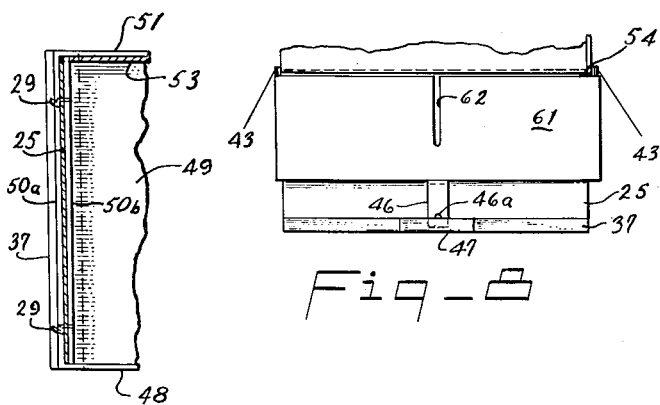
INVENTOR.
HAROLD A. MEYER
BY Edward B. Gregg
ATTORNEY

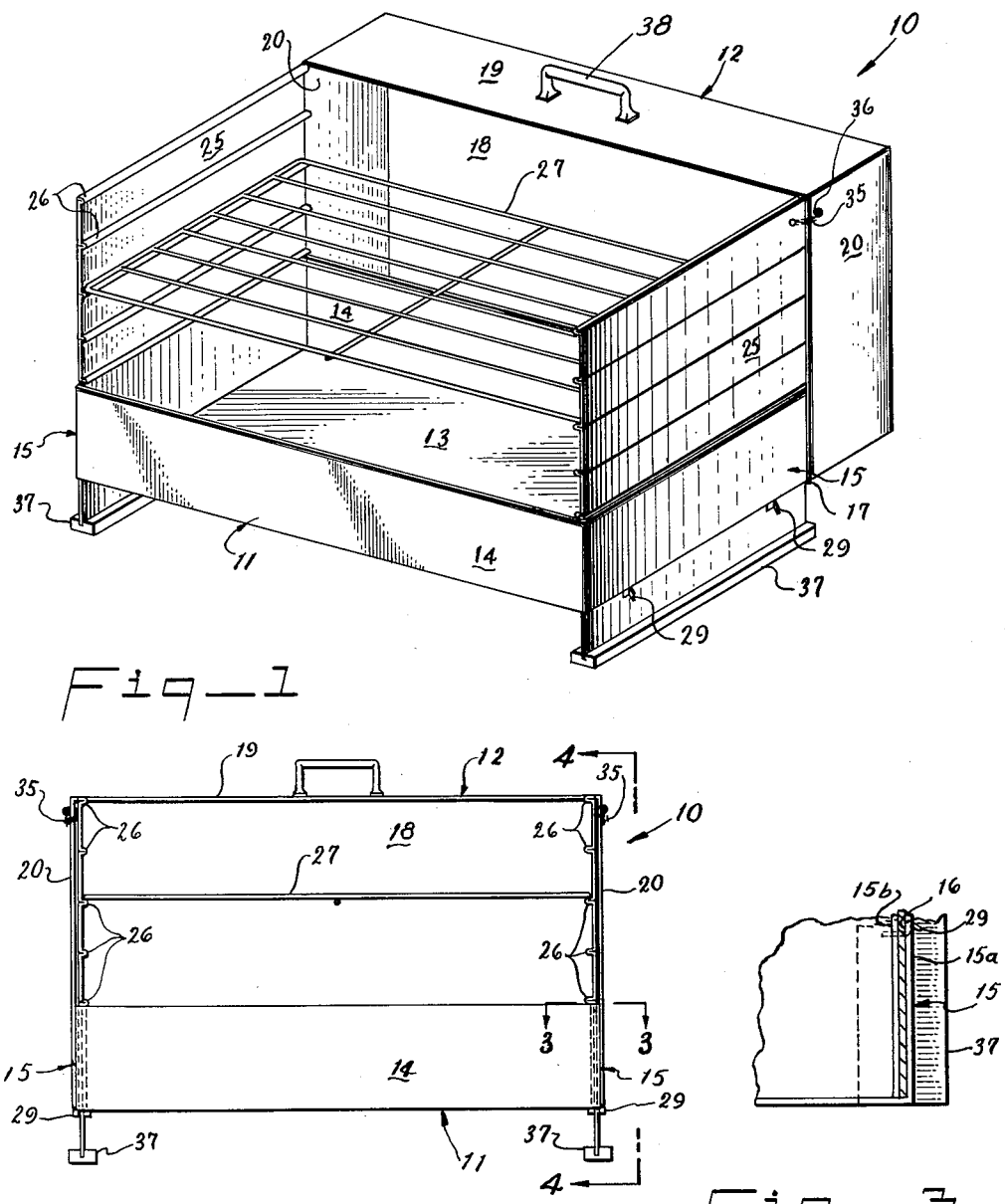

3,060,918
PORTABLE BARBECUE
Harold A. Meyer, 3512 Webster St., San Francisco, Calif.
Filed Mar. 13, 1959, Ser. No. 799,263
1 Claim. (Cl. 126—9)

This invention relates to a portable, knockdown type of barbecue.

Barbecues are available of many types including built-in barbecues which are immobile and portable barbecues which have the advantage of mobility. The present invention relates to the portable barbecues.

Portable barbecues as provided heretofore have the advantage of mobility; they can be moved from place to place. However, most portable barbecues are bulky and cannot be used conveniently for such purposes as camping and picnics at the beach, because they cannot be knocked down into a small package which is easy to store, transport in an automobile and carry by hand. Other portable barbecues which can be knocked down to a compact condition are inconvenient or inefficient to use.

The present invention relates more particularly to barbecues which are portable, which can be easily knocked down into a condition wherein they are compact and very easily transported, which can be easily reassembled into operating form and which are convenient and efficient to use.

It is, therefore, an object of the present invention to provide improvements upon barbecues.

It is a further object of the invention to provide improvements upon portable barbecues.

It is a further and particular object of the invention to provide portable barbecues which can be assembled and disassembled with ease, which in their disassembled condition are very compact and easily transported, and which, in their assembled condition, are convenient and efficient for use.

Other objects include the provision of a portable, knockdown type of barbecue which is easy to clean, which is light in weight and which can be set up and used in the hearth of a fireplace.

The above and other objects of the invention will be apparent from the ensuing description and the appended claim.

Certain forms of the invention are illustrated by way of example, in the accompanying drawings, in which:

FIGURE 1 is a perspective view of one form of barbecue in accordance with the present invention.

FIGURE 2 is a view in front elevation of the same.

FIGURE 3 is a fragmentary horizontal section taken along the line 3—3 of FIGURE 2.

FIGURE 4 is a view in end elevation as seen along the line 4—4 of FIGURE 2.

FIGURE 5 is a plan view of one of the detachable end plates of the barbecue.

FIGURE 6 is a view in front elevation of a modified form of barbecue constructed in accordance with the invention.

FIGURE 7 is a fragmentary horizontal sectional view along the line 7—7 of FIGURE 6.

FIGURE 8 is a fragmentary end elevational view as seen along the line 8—8 of FIGURE 6.

FIGURE 9 is a perspective view of one of the retainer clips employed to lock the end plates in their operating positions.

Referring now to the drawings and preliminarily to FIGURES 1 and 2, a portable barbecue is there shown which is generally designated by the reference numeral 10. It comprises a firebox 11 and a cover 12 which also serves as a shield and back wall for the barbecue when it is in operating position. The firebox 11 comprises front and rear walls 14, end walls 15 and a bottom 13. The bottom may be perforated for air circulation and for dropping ashes.

Referring more particularly to FIGURE 3, each end wall 15 of the firebox 11 is a double wall comprising an outer portion 15a and an inner portion 15b which are spaced apart to provide a slot 16. The purpose of the slots 16 will be described shortly.

The cover 12 is hinged to the bottom, rear edge of the firebox 11 as shown at 17 and it is composed of a cover portion 18, a front wall 19, and two end walls 20.

Referring now to FIGURE 5 as well as FIGURES 1, 2 and 3, end plates 25 are provided, one for each end of the firebox 11. As will be seen, each of the end plates 25 is formed with ribs 26 thus providing supports at several different levels for a grill 27, the ends of such grill being supported by a pair of ribs 26. Near its lower end each of the end plates 25 is punched to form slots 28. Referring to FIGURE 9, a Z-shaped retainer clip 29 is provided for each of the slots 28. Thus in assembling the barbecue the end plates 25 are passed through the slots 16 in the end walls 15 and the retainer clips 29 are inserted in the slots 28. Thus the firebox 11 rests on the retainer clips 29 and does not drop to the bottom. Therefore, the end plates 25 project below the bottom surface 13 of the firebox 11 and function as legs to support the firebox above the ground as well as supports for a grill and as extensions of the end walls 15.

For the purpose of supporting the cover 12 in upright position as shown in FIGURES 1 and 4, each of the end plates 25 is provided with a bead chain 35 suitably fixed thereto. The adjacent portion of the end walls 20 of the cover 12 are formed with holes 36 to receive the free ends of the bead chains 35. It will, therefore, be apparent that the cover 12 is securely held in upright position by the end plates 25 and chains 35.

Feet or base members 37 are provided for the lower edges of the end panels 25, such feet being suitably in the form of strips of wood which are slotted to receive the lower edges of the plates 25.

It will be apparent that, with the barbecue in the operating position shown in FIGURES 1, 2 and 4, it provides a very sturdy barbecue which is very effective and convenient for the purpose. Thus the firebox 11 can be made of a size to accommodate any desired amount of fuel. The firebox together with the end plates 25 and the cover 12 effectively shield the firebox so that the barbecue can be operated even in a windy area such as an ocean beach. The firebox 11 is elevated from the ground by the lower portions of end plates 25. The grill 27 can be located at any height desired and can be adjusted from time to time as needed.

In knocking down the barbecue from the operating condition shown in FIGURE 1, it is merely necessary that the feet 37 and retainer clips 29 be removed and placed in the firebox 11 so that they will not be lost; that end plates 25 be removed and laid flat in the firebox 11 along with the grill 27; and that cover 12 can be swung down to enclose the disassembled barbecue. It can then be transported as by means of a handle 38.

In assembling the barbecue the reverse operations are carried out. That is to say, the cover 12 is opened; the grill 27 and end plates 25 are removed from the firebox and the end plates are inserted in the slots 16; the clips 29 are inserted; the grill 27 is installed; and the chains 35 are attached to the cover 12.

Other advantages of the barbecue of FIGURES 1 to 5 include the following: It can be made of light gauge sheet metal and provided with an asbestos pad covered with aluminum foil to protect the bottom from heat. This pad can then be lifted out and emptied, thereby contributing to the cleanliness of the barbecue. The barbecue can be installed and used on the hearth of a fireplace indoors. The firebox can serve as a pan for dish washing, etc.

Referring now to FIGURES 6, 7 and 8, a modified form of barbecue is there shown which is generally designated by the reference numeral 40 and which comprises a firebox 41 and a cover 42 hinged to one end of the firebox at 43. Preferably the hinges 43 are detachable so that the cover 42 can be separated, if desired. The cover 42 has front and rear walls, one of the front walls being shown at 44 in FIGURE 6. Handles 45 are provided, one of which is shown in FIGURE 6. The cover 42 is also provided with a hinged leg 46 at its opposite side, which is fitted with a slotted foot member or base 47.

The firebox 41 has a front wall 48, a bottom 49 (see FIGURE 7), double end walls 50a and 50b at each end and a rear wall 51 (see FIGURE 7). The double walls 50a, 50b are spaced to slidably receive end plates 25 like those shown in FIGURES 1, 2 and 3. Inasmuch as the cover 42 does not serve as a shield as in the barbecue of FIGURES 1 to 5, a separate sheet metal piece 53 is provided whose lower end fits in the firebox and which is formed with tongues 54 which fit into the ribs 26 of the end plates 25. The shield 53 is, therefore, supported in vertical position. The ribs 26 also support a grill as shown at 27. As in the case of the barbecue of FIGURES 1 to 5, the end plates 25 also serve as legs to support the firebox above the ground. The lower edges of these legs are seated in slotted feet or base members 37. Clips are provided at 29 like that shown in FIGURE 9.

Referring to FIGURES 6 and 8, the cover 42 has a side wall 61 to which the leg 46 is hinged, such leg being formed with a hole 46a. The side wall 61 is slotted at 62.

When the barbecue illustrated in FIGURE 6 is disassembled the feet 37 and 47 and the clips 29 are removed and placed in the firebox 41; end plates 25 and rear shield 53 are also removed and placed in the firebox; and the cover 42 is swung over the firebox 41. The leg 46 now becomes a clasp whose hole 46a fits over an eye 63 which is shown in FIGURE 6 fixed to one end of the firebox 41, such eye passing through the slot 62. By inserting a padlock or any other suitable keeper in the eye 63, the disassembled barbecue will be locked in closed position.

In the embodiment of my invention shown in FIGURES 6, 7 and 8, the cover 42 serves as a lateral extension for holding things such as steaks awaiting their turn on the grill, etc.

It will, therefore, be apparent that a novel and very useful and advantageous form of barbecue has been provided which is easily assembled and disassembled; which when disassembled is very compact and can be easily carried about; and which when assembled is a very efficient device for the purpose.

I claim:

A portable barbecue of the character described comprising a firebox having a bottom, a front wall and a rear wall and having also pair of double end walls forming slots at opposite ends of the firebox extending substantially throughout the width of the latter, an end plate for each double end wall having a lower portion slidable through the slot formed by such end wall and having an upper, grill-supporting portion formed with projections for supporting a grill; and means for supporting each end plate in its associated slot with the lower portion projecting beneath the firebox to form a leg and with the upper portion projecting above the firebox to provide an extension of the respective end wall and to provide the grill support.

References Cited in the file of this patent

UNITED STATES PATENTS

| | | |
|---|---|---|
| 416,068 | Muller | Nov. 26, 1889 |
| 1,518,713 | Trow | Dec. 9, 1924 |
| 1,785,143 | Oonk | Dec. 16, 1930 |
| 1,917,628 | Altorfer | July 11, 1933 |
| 2,119,799 | Sivey | June 7, 1938 |
| 2,207,307 | Teller et al. | July 9, 1940 |
| 2,334,847 | Spiers | Nov. 23, 1943 |
| 2,604,884 | Walker | July 29, 1952 |
| 2,639,704 | Gilchrist | May 26, 1953 |
| 2,742,033 | Bramming | Apr. 17, 1956 |

FOREIGN PATENTS

| | | |
|---|---|---|
| 363,143 | Great Britain | Dec. 17, 1931 |
| 604,729 | Great Britain | July 8, 1948 |

OTHER REFERENCES 1958 publication titled "Deluxe Folding Bar-B-Q," by the Star Ornamental Iron Works of Los Angeles, California (1 sht. only).